Aug. 25, 1959 P. J. BARDY ET AL 2,901,209
CONTAINER FILLING MACHINE
Filed Jan. 30, 1956 6 Sheets-Sheet 3

Inventors
Peter J. Bardy
Abraham Siegelman

Aug. 25, 1959  P. J. BARDY ET AL  2,901,209
CONTAINER FILLING MACHINE
Filed Jan. 30, 1956  6 Sheets-Sheet 4

Inventors
Peter J. Bardy
Abraham Siegelman
By Attys

United States Patent Office 2,901,209
Patented Aug. 25, 1959

2,901,209

CONTAINER FILLING MACHINE

Peter J. Bardy, Park Ridge, and Abraham Siegelman, Chicago, Ill., assignors to Armour Research Foundation of Illinois Institute of Technology, Chicago, Ill., a corporation of Illinois Application January 30, 1956, Serial No. 562,214

22 Claims. (Cl. 249—15)

The present invention relates to a weighing and dispensing system and more particularly relates to a system for dispensing accurately measured and accurately weighed quantities of a material.

While systems, methods and apparatus embodying the principles of the present invention are of general utility and may be quite varied in form for dispensing accurately measured weights and quantities of fluid, powdered and granular materials, the particular embodiment of the invention described in detail herein is described as one for dispensing and accurately weighing such a material as pellets of explosive compounds for cartridge and shell cases of ammunition so that each cartridge or shell shall uniformly have the same accurately measured weight of explosive content.

It is, therefore, one of the important objects and features of this invention to provide a new and improved system for dispensing accurately weighed and measured quantities of material such as powderous or pellet explosive material for ammunition cartridge or shell casings.

The system of the instant invention is comprised of new and improved apparatus and method effective to fill a container to be emptied into the ammunition cartridge or shell casing, weigh the container, adjust the weight of material therein to the desired weight therefor, check the weight of the container and material, pour the material from the container into the cartridge or shell casing, and refrain from pouring a container holding an incorrect weight of explosive material therein. In addition, the system is effective to discard-pour the material from the container holding an incorrect quantity or weight of material, as well as to reject an empty cartridge or shell casing from the conveyor line carrying the filled cartridge or shell casings. Still further, in such instances as the filling of 75 mm. shell casings, this system is effective to charge a length of metal foil into the shell casing after filling the casing with the accurately measured desired quantity of explosive material.

It is obvious that such a system including the apparatus and methods thereof may be utilized with little or no variation to fill packages and containers of consumer goods, etc.

The operations are carried out at a plurality of stations each performing a particular step and the stations being so interconnected and interrelated as to cooperate with each other for performing the desired operations. In general, a plurality of containers are transported from station to station where the operations are to be conducted and the containers are generally acted upon in groups so that a sufficient time to carry on the designated operations may be allowed at each station without hampering or delaying general production line operations and techniques.

At a first station in the arrangement a first group of containers is filled with the explosive pellets. Sensing devices open the gates on hoppers for filling the containers and other sensing devices close the gates when the containers are full. Side compartments on the containers are shielded from receiving any material at this station.

When the hopper gates are closed at the first station material standing above the upper edge of the container is wiped away so that the material level is generally level with the top of the container and the containers are moved to a next or second station. By wiping away the material standing above the container tops and by carefully selecting the size of the container, the weight or quantity of material in the container will be slightly less than the desired weight for the material to be eventually emptied into the cartridge or shell casings.

At the second station the containers are weighed to determine the weight of material contained therein and the supplementary quantity of material which must be added thereto in order to bring the total weight of material in the can up to the desired weight. Signals produced at this station are transmitted to the next station and control the operation of the next station which is a supplementary or an additional material pouring station effective in operation to add only selective quantities or weights of the material to the containers, respectively.

Following weighing at the second station, the containers are moved to the third station which is an additional or supplementary material station as described. While the first group of containers was at the second station, a second group of containers were disposed at the first station and there filled, as described above. Now, when the first group is moved to the third station the second group is moved to the second station and a third group is disposed at the first station, etc. This manner of operation is continuous so that all stations, including those to be described hereinbelow, are in operation simultaneously even though the groups of containers are acted upon successively.

At the third station the containers are moved into position for receiving a supplemental quantity of material in the side compartments of the containers, the compartments which were shielded at the first station, from supplementary material dispensing means controlled by signals from the weighing or second station. Here the correct quantity of material is added to each container to bring the weight of material therein up to the desired weight or quantity of material. After completion of this operation, the containers are moved to a fourth station where they are again weighed to accurately determine the quantity of material therein and transmit the signals to the fifth station to control the operation thereof.

The containers are then moved to the fifth station where the material therein is poured into cartridge or shell casings. The signals from the fourth station so control the fifth station that only those containers holding the correct and accurately measured and weighed quantity of material are poured. Containers having an incorrect weight of material are restrained from pouring at the fifth station and are poured in a discard pour operation conducted at the sixth station to which they are moved following completion of the pouring operation at the fifth station. From the sixth station the first group of containers is again moved to the first station where the primary filling operation and dispensing operation takes place as described above.

In the meantime, empty cartridge or shell casings are continuously fed to the fifth, above described, station where they are filled by the pouring of the containers thereinto. As the filled cartridge or shell casings are moved away from the fifth station, sensing means detect the empty cartridge or shell casings which were not filled inasmuch as the containers that would have been poured thereinto did not contain a correct weight of material, as determined at the fourth above described station. This sensing means is effective to operate a rejecting mechanism which moves the empty casings off of the line.

In the case of 75 mm. shells or such other shells as may require the same, the instant invention contemplates charging a length of metal foil thereinto at a charging station following the empty cartridge or shell casing rejection station.

The mechanism of the instant invention which is operative to perform the operations as described above is an integrated mechanism carrying substantially all of the components which are interrelated for performing the described functions. The mechanism itself includes not only the conveying system for the groups of containers but also includes the hoppers, the scales, the adjusting weight dispensing devices, the pouring operators and a discard powder bin. Further, the mechanism includes the control systems operating to control the weight-adjusting dispensing devices as well as the pour or restrain devices, etc.

From the foregoing short description of some of the principles, characteristics and features of the present invention it will be readily understood that an object of the invention is to provide new and improved apparatus and method and a new and improved system for dispensing accurately measured quantities of a material to be dispensed.

Another object of this invention is to provide a system of the type described wherein the material is first dispensed in an amount slightly less than the desired amount and the difference is determined and thence added to the first quantity of material.

Still another object of the present invention is to provide a new and improved system of the type described wherein material is first dispensed in an amount slightly less than the desired amount after which the difference amount of material is determined and added whereupon the entire quantity is rechecked before final dispensing thereof to determine the accuracy of the amount to be dispensed.

Still another object of the present invention is to provide a new and improved system of the type described including a control system operable to determine the deficiency in the originally dispensed amount and to control a supplemental or additional material dispenser to cause the same to dispense only the required additional quantity of material.

Still another object of the present invention is to provide a new and improved system of the type described wherein sequential interrelated and interconnected operations are effected for filling containers, checking the weight of the contents therein and adding any deficiency necessary, rechecking the weight of materials in the containers, dispensing the material from the containers but restraining any pouring of material from containers holding an incorrect quantity of material, and discarding and recovering material in containers holding an incorrect amount or quantity thereof and thereafter rejecting ultimate containers which were not filled and charging metal foil into the filled containers.

Still another object of the present invention is to provide a new and improved system of the type described with a new and improved mechanism and method for charging metal foil into a container.

Still another object of the present invention is to provide a system of the type described with new and improved method and apparatus for dispensing material from a container and for tilting the container to pour the material therefrom.

Still another object of the present invention is to provide a new and improved control system for tilting and emptying containers holding a correct quantity of material therein and for restraining containers holding an incorrect quantity of material from being poured.

Many other objects, features and advantages of the present invention will be readily apparent to those skilled in the art and others from the following detailed description of the present invention and an embodiment thereof, from the claims, and from the accompanying drawings in which like reference numerals are applied to like parts, in which each and every detail shown is fully and completely disclosed as a part of this specification, and in which:

Figure 1:
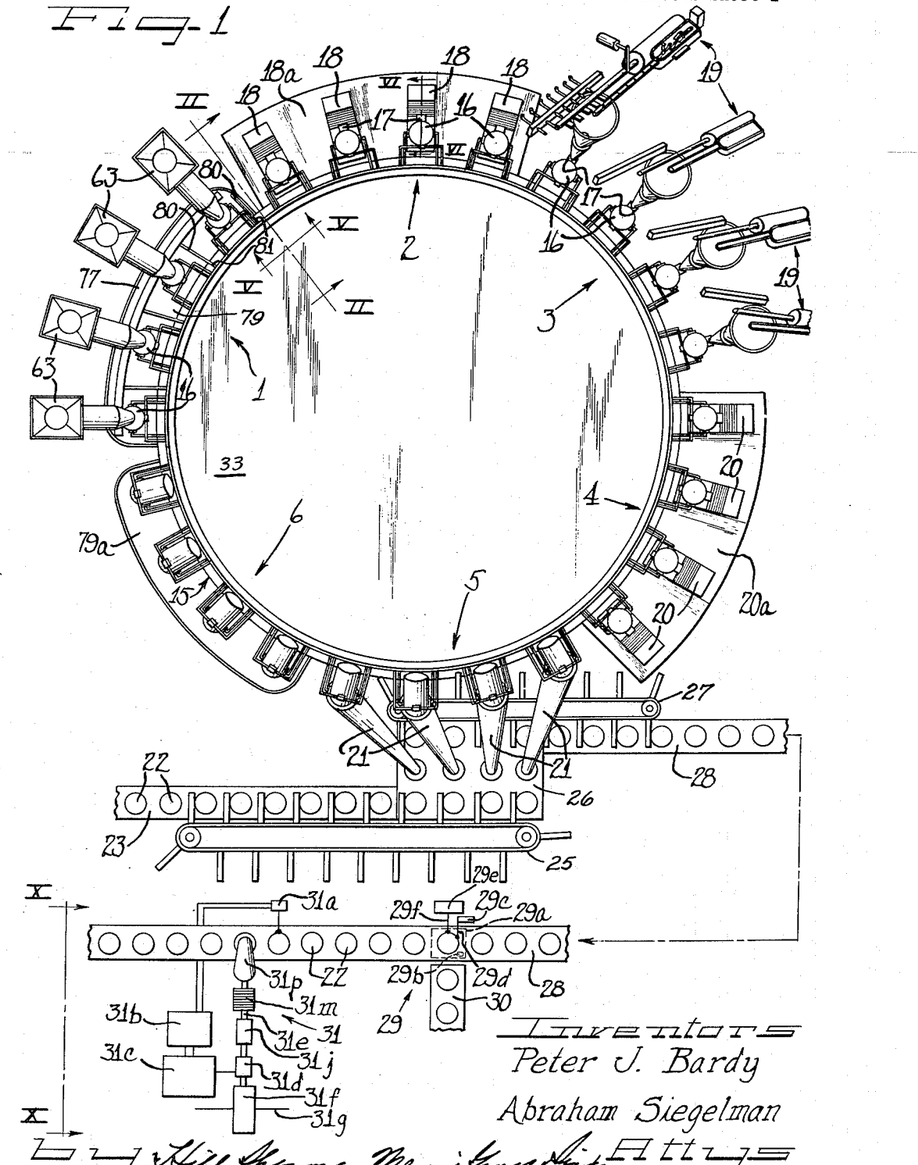
Figure 1 is a plan view of the mechanism of the system embodying the principles of this invention.

As pointed out above, the system of the invention is operative to perform a plurality of interrelated operations to dispense accurately measured and accurately weighed quantities of a material such as pellets of explosive material for filling cartridge and shell casings. In Figure 1 there is illustrated in plan view a mechanism operative by this system incorporating the same and embodying the principles of this invention. As shown in Figure 1, the mechanism includes a drum-like stand or housing 15 carrying the mechanism and elements effective to perform six stages of operation and to carry six of the stations of operation. For convenience these six stages of operation and the six stations of operation will be known as "volume fill," "powder weigh," "adjust weight," "check weigh," "pour," and "discard pour," respectively. These six stations are indicated on Figure 1 of the drawings and on the drum-like housing 15 by the numerals 1, 2, 3, 4, 5 and 6, respectively, the six numerals respectively indicating the six successive stations.

The drum-like housing 15 has incorporated therein a ring conveyor which carries, in this embodiment of the invention, 24 open-topped containers 16—16 which are operationally divided into six groups of four containers each. That is, the 24 containers carried by the ring conveyor on the drum housing 15 are operationally divided so that there are four containers in each group and there is one group of containers at each of the six operating stations 1 through 6.

Each of the containers 16 has a primary volume section generally configurated as a can with an open top and a small open top compartment at the radial outer front of the can, as indicated generally at 17. At the first station the main compartment or can-like section of the containers 16 is filled with explosive material pellets whereupon the ring conveyor is rotated one-sixth of a revolution and these containers are lowered onto scales 18 at station 2, the powder-weigh station. At the same time, the containers from station 6 are moved to station 1 where they are filled with explosive powder pellets. The scales 18 provide input signals to a control system to control the operation of supplementary dispensers 19 at the adjust weight station, station 3, to which station the containers are moved from station 2 upon the next indexed rotational movement of the ring conveyor.

At station 3 whatever additional pellets of weight are necessary, as indicated by the signals from the scales at station 2, are added to the containers 16 and are specifically loaded into the supplementary small compartments 17 on the containers 16. By adding these additional pellets to a side compartment which is otherwise empty, there is no likelihood of losing the extra pellets as by having them fall onto an already brim-full container.

After the additional pellets are added to the containers 16 the ring conveyor is again rotated one-sixth of a revolution to the check weigh station, station No. 4, where the containers are lowered onto scales 20 which check the weight of the material in the respective containers and transmit signals to a control system in control of the pouring mechanisms at station 5, the pour station. After check weighing, the ring conveyor again rotates one-sixth of a revolution so that the four containers 16 which were formerly at station 4 are now moved to station 5 where they respectively overlie funnels 21 converging to four cartridge or shell casings 22. At station 5 the containers are tipped up and poured into their respective funnels for emptying into the respective shell casings 22, or they are restrained from pouring, depending upon the signals provided to the control system and supplied from the scales 20 at station 4. The control system is such that containers holding a correct and accurately measured quantity and weight of explosive pellets or powder are poured, while those containing an incorrect weight of material are not poured. Thereafter, the ring conveyor is again rotated one-sixth of a revolution and all of the containers are again poured at station 6, which is the discard pour station. At this station containers holding an incorrect quantity or weight of material are emptied but there is no need to provide mechanism here for restraining the empty containers from being moved into a pouring or tilted-up position.

In this arrangement of the elements it will be clearly observed that all of the operations are being conducted simultaneously and that four containers are being acted upon at each station each time the ring conveyor rotates one-sixth of a revolution. The actual number of containers on the ring conveyor and the number of containers provided for each station of operation and activity is variable without any departure from the spirit and scope of this invention. It is, of course, preferred that the number of containers on the ring conveyor be a multiple of six so that all stations will have an identical number of containers thereat each time activity or operating procedures take place.

The empty shell casings are transported to station 5 by such means as a belt conveyor 23 extending more or less tangential but spaced from the drum housing 15 and leading to a lug conveyor belt system 25 which moves the shell casings forwardly onto a second conveyor belt 26 operatively arranged to move the shell casings four at a time radially of the drum housing 15 so that the casings 22 will underlie the funnnels 21 four at a time, one at each funnel. At the radially innermost position of the conveyor 26, the full casings, and such empty casings as may have been underlying a funnel for a container 16 holding an incorrect weight or quantity of powder pellets, are again moved tangentially by a lug conveyor 27 onto a conveyor belt 28.

This last mentioned conveyor 28 which may be of the belt-type leads over an empty casing reject station 29 which is operative to sense empty cartridge or shell casings and push the same off the conveyor 28 onto a supplementary conveyor 30 from which they are carried back to the general supply of shell casings to eventually again find their way onto the conveyor 23 to be filled. The conveyor 28 then carries the filled casings to a charging station 31 where, in such cases as working with 75 mm. shell casings, measured lengths of foil are charged into the shell casings. From the charging station the shells are then carried on to such other operating stations as may be desired or necessary for completion of the cartridges or shells to finally be completed as rounds of live ammunition.

While the foregoing discussion should give a thorough general understanding of the general arrangement of the instant invention, an understanding of the details of the mechanism and system and each stage thereof may be had from the following detailed discussion of the elements in the system. For facilitating understanding of the details of the system the remainder of the specification is broken down into topics correlated to parts of the system and stages of operation.

*The ring conveyor and drive mechanism*

Figure 2:
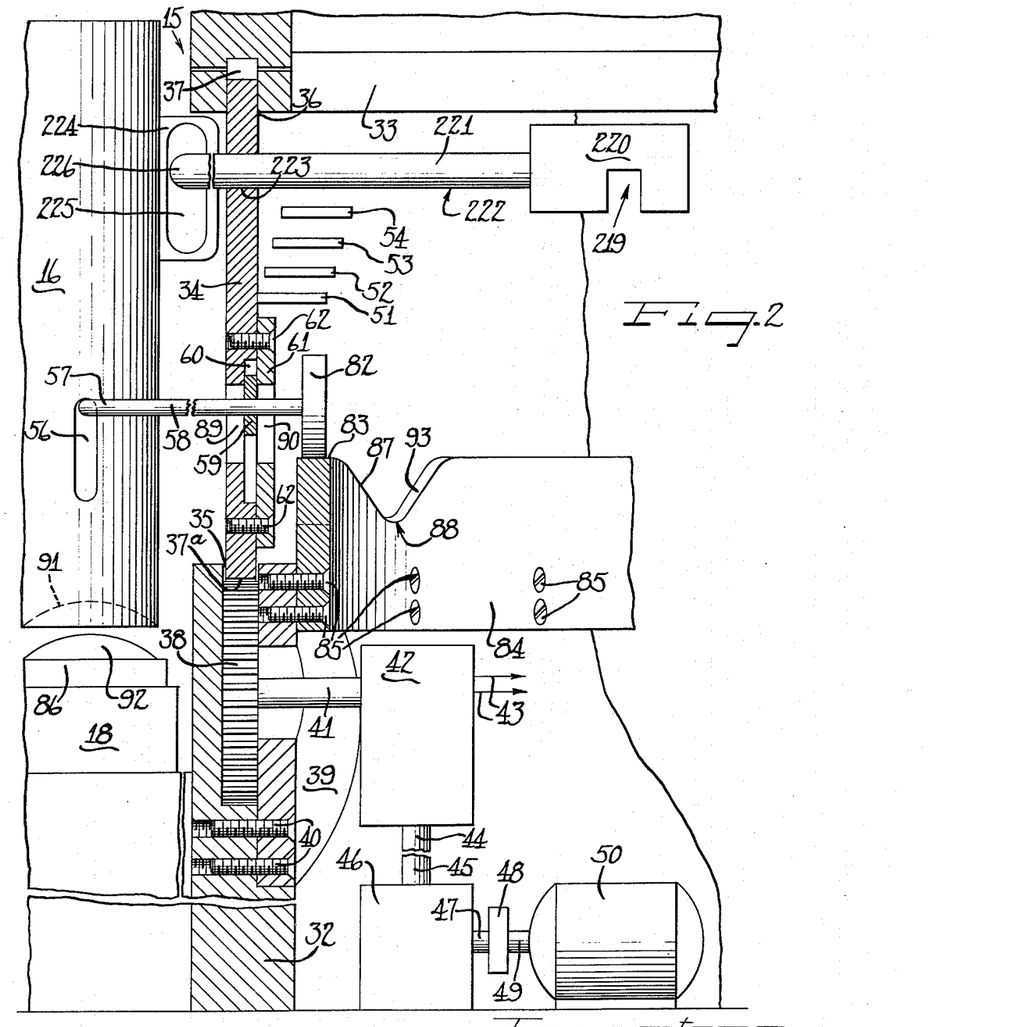
Figure 2 is a fragmental sectional view of the mechanism of Figure 1 viewed as taken substantially along the line II—II of Figure 1.

Referring now to Figure 2, which is a sectional view of the drum housing viewed as taken substantially along the section line II—II, the ring conveyor and drive system may be seen in enlarged detail. Here it may be seen that the drum housing 15 has a base drum 32 and a cover 33 which are coaxially arranged but spaced from each other to accommodate a conveyor ring 34 which is also coaxial therewith. The annular conveyor ring 34 is carried on and supported by the drum base 32 and cover 33 for rotation about its axis and means is provided to hold the conveyor ring in position. Any convenient means for holding the conveyor ring may be utilized, and in the embodiment shown both the base 32 and cover 33 are grooved on their facing radial surfaces as at 35 and 36, respectively, to receive the lower and upper axial extremities of the conveyor ring 34. Rollers such as the roller 37 in the cover 33 are provided in both the cover and the base to provide substantially frictionless movement of the ring.

All of the cans 16 are supported by the conveyor ring 34 and carried thereby so that rotation of the ring 34 will be effective to move the containers 16 from station to station during the operation of the system. To rotate the conveyor ring the lower face thereof is formed as a ring gear as at 37a to mesh with a spur gear 38 journaled in a recess in the drum base 32 adjacent to and communicating with the groove 35. The spur gear 38 is held in position by a plate 39 overlying the same and closing the recess in the drum base 32. Such convenient means as screws 40 or the like hold the plate 39 in place.

The spur gear or drive gear 38 is fixed on a shaft 41 which shaft is the output shaft of the control brake and clutch mechanism shown schematically by the box 42 having leads 43 which extend therefrom and may connect the control brake and clutch to any desired control system such as a timing mechanism or a cam actuated control switch system for controlling actuation and rotation of the shaft 41 to thereby control stopping and starting of the rotaional movement of the conveyor ring 34. The actual driving power for the shaft 41 is received in the control brake and clutch mechanism on an input shaft 44 connected to the output 45 of a drive speed reduction and control mechanism illustrated schematically by the box 46 which in turn has its input shaft 47 connected through a coupling 48 to the shaft 49 of a motor 50.

Any number of control systems are available to those skilled in the art for controlling the control brake and clutch mechanism 42 to drive the ring gear 34 intermittently by one-sixth revolution steps. Such possible control systems include timing mechanisms as well as cam-actuated switches that may be actuated by any one of the four cam dogs 51, 52, 53 and 54 that are secured to the radial inner face of the conveyor ring 34 at each group of four containers 16, or by any other supplementary control cam which may be fixed to the conveyor ring 34, as well as by any other switching system that may be employed as desired.

Here, it should be noted that there is one cam dog for each container 16 but that the cam dogs of each group are spaced not only peripherally on the inner radical face of the conveyor ring 34, but are also spaced axially of each other within each group to accommodate independent control systems for each container 16 at each station.

The containers 16 themselves have elongated recesses 56 in each side thereof to receive the ends 57 of container support arms 58 carried by the conveyor ring 34. Actually, these support arms 58 are carried by slide blocks 59 slidably arranged in recesses 60 in the conveyor ring 34 and fixed in position radially by guide plates 61 secured to the conveyor ring 34 by such convenient means as screws 62. This construction permits the containers 16 to be raised and lowered for weighing the same on scales 18 and 20 at weigh station 2 and check weigh station 4. The raising and lowering mechanism and the operation thereof will be described below in conjunction with the description of the weigh station and the check weigh station.

Station 1—The volume fill station

Figures 3, 5:
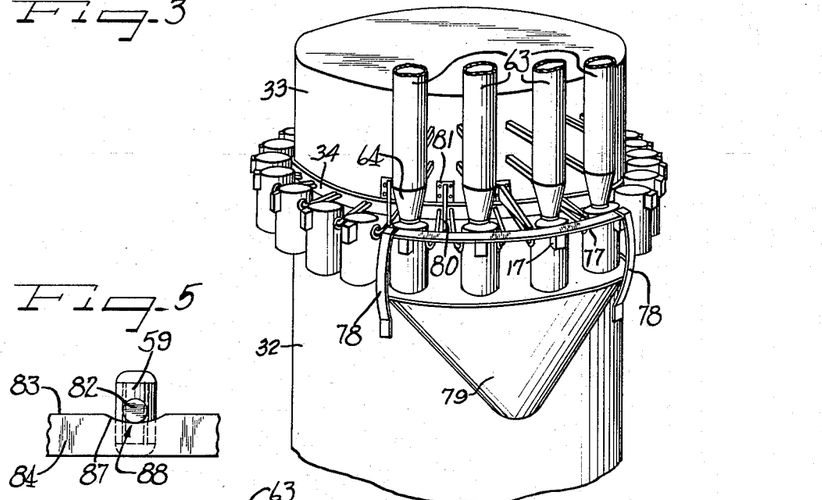
Figure 3 is a perspective view of the mechanism embodying the principles of this invention and particularly illustrating the first station of operation thereof.
Figure 5 is a fragmental view of the cam and follower for lowering a container onto the scale for weighing the same and is viewed as taken substantially along the line V—V of Figure 1.
Figure 4:
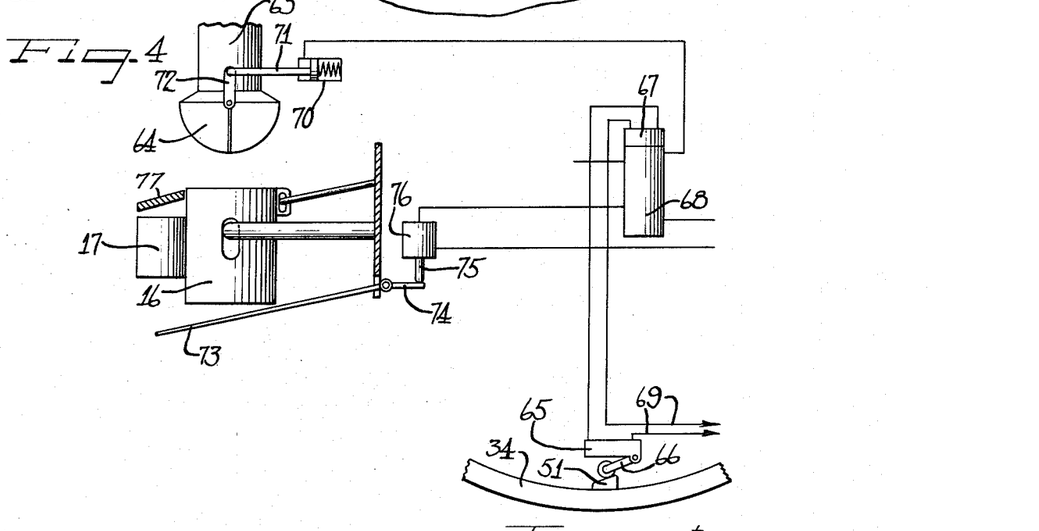
Figure 4 is a more or less schematic and diagrammatic illustration of the system operating the first station of operation of the mechanism of this invention.

The mechanism and control system for the volume fill station, station No. 1, are illustrated in Figures 1, 3 and 4. In these figures it is shown that at the volume fill station four containers 16 are disposed immediately below four hoppers or supply ducts 63—63. At the lower end of each of the supply ducts or hoppers 63 there is provided a gate 64—64 or other equivalent valve means for opening and closing the duct or hopper to fill the powder containers 16 and then stop the flow of material when the containers 16 are filled. The opening and closing of the supply ducts is effected automatically by the control system provided for each of the ducts, one of which control systems is illustrated in detail in Figure 4.

The control system of Figure 4 is an electropneumatic system whereby the gate 64 is automatically pneumatically opened when the containers 16 are in position as carried by the ring conveyor. To this end, a limit switch 65 such as a microswitch or the like is closed by one of the cam dogs 51 through 54 (Figure 2) when the conveyor ring 34 brings the containers 16 to their proper position. In Figure 4 the particular trip cam dog involved is illustrated as the cam dog 51, it being understood that one of each of the cam dogs is provided for each of the containers 16. Closing of the limit switch 65 by engagement of the arm 66 thereon by the trip cam dog 51 permits energization of the solenoid 67 on a three-way valve 68 from a source of electrical energy supplied thereto through supply leads 69 and the switch 65. Energization of the solenoid 67 actuates the valve 68 to supply pressurized air to a pneumatic cylinder 70, the piston 71 of which is connected through a link 72 to the gate 64 whereby movement of the piston 71 opens the gate 64 and permits the material to flow from the supply duct 63 into the main chamber of the container 16.

When the container 16 is full, the powder overflows therefrom and falls upon a fill detector lever 73 which is pivotally connected to the drum housing base 32. Deflection of the fill detector lever causes the inner end 74 of the lever to move a plunger 75 on a pilot valve 76 so connected to the air supply three-way valve 68 as to cause the spring return cylinder 70 to be exhausted and thereby close the gate 64 cutting off any further flow of material to the already brim full powder container.

To prevent any of the material from flowing into the supplementary container compartments 17, these compartments are shielded or covered by a bar-like shield 77 (Figures 3 and 4) which overlies the compartments 17 and is supported on support brackets 78 fixed to the drum base 32 at the first station.

Both the shield or auxiliary compartment cover 77 and the fill detector lever 73 are at an angle to the horizontal plane so that material falling thereon will fall therefrom rather than be piled up thereon. To receive any excess material flow a chute 79 is provided on the drum housing 15 below the containers 16. This chute 79 leads into a material-recovery system.

After the containers 16 are all filled at the volume fill station, station 1, the ring conveyor is rotated one-sixth of a revolution to the weigh station, station 2. En route to the weigh station the containers each pass under wiper blades 80—80 secured to the housing cover 33 by carrier brackets 81. These blades 80 so overlie the path of movement of the containers 16 that they operate as wiper blades to level the material in each of the containers at the level of the top edge of the containers and all excess material is wiped away to fall into the recovery chute 79. Since the containers are designed to have a volume such that they hold a weight of material slightly less than the desired weight for material to be eventually dispensed into the casings 22, these wiper means so limit the weight in the containers to that amount slightly less than the desired weight as the containers leave station 1 and are conveyed to station 2.

The weigh station—Station No. 2

Figure 6:
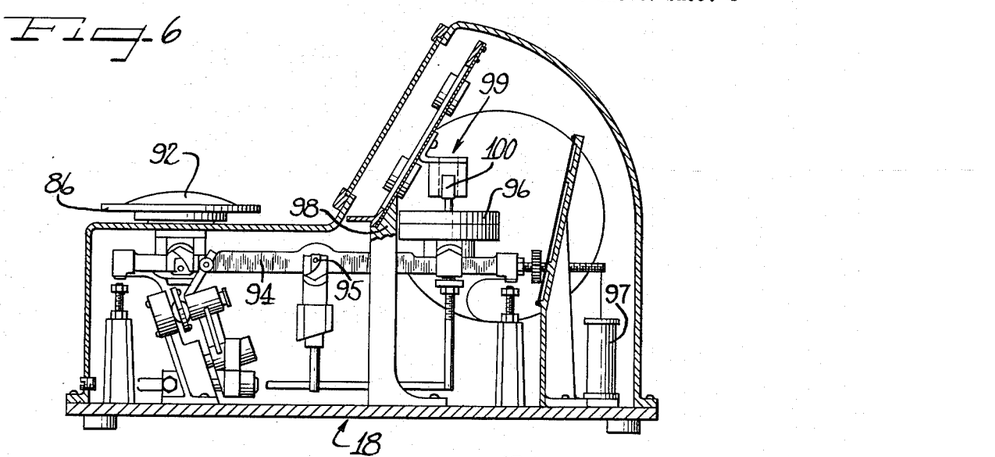
Figure 6 is a full sectional view of one of the weighing scales viewed as taken substantially along the line VI—VI of Figure 1.
Figure 7:
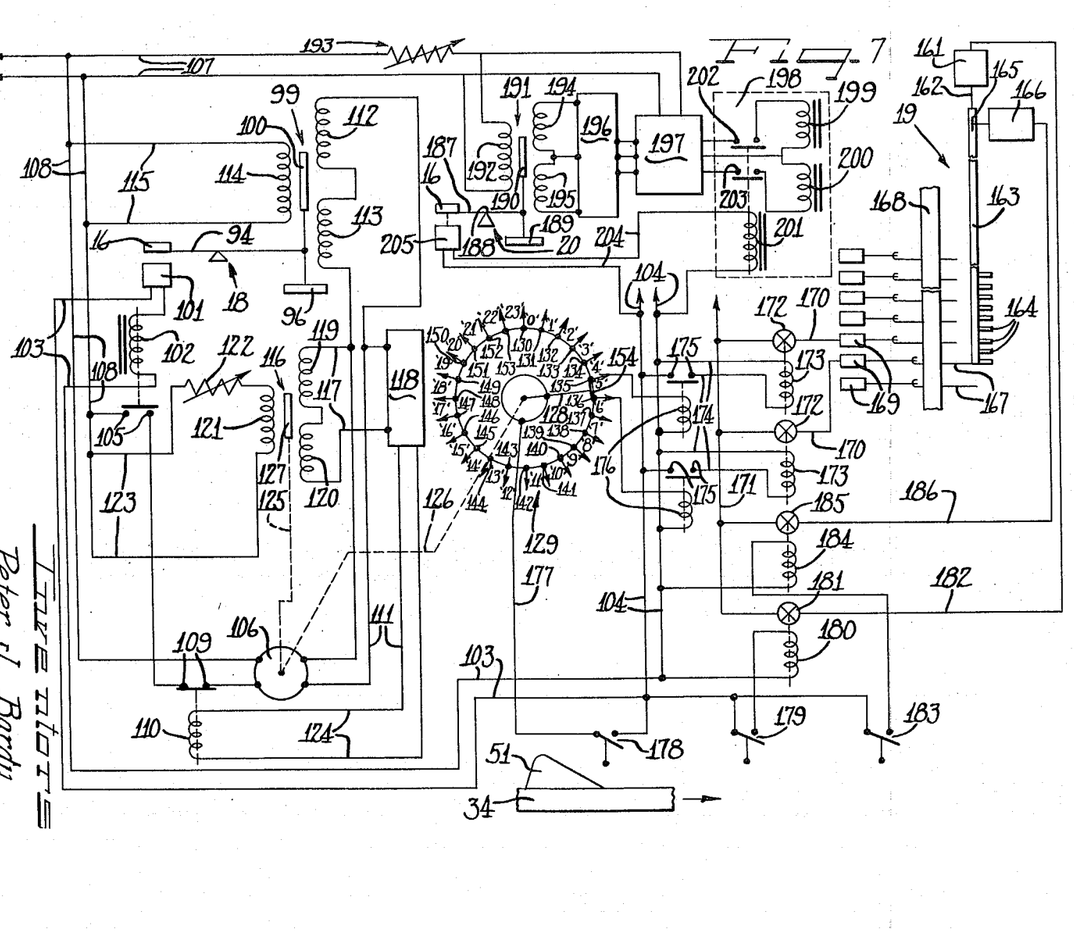
Figure 7 is a schematic illustration of the control system for the weighing station, the weight-adjusting station, the check-weighing station, and the accept or reject system of the pouring station.

At the weight station the weight of each of the four containers that were filled at station 1 and the weight of the material in each thereof is determined. Since the actual weight of each container with its contents is not a matter of primary concern in this embodiment of the invention but only the deficiency in the weight thereof from the desired weight is of importance here. Therefore, while any number of systems and mechanisms are available for weighing the containers and their contents to determine either the weight thereof or the deficiency, balance-type scales 18 have been used in this embodiment of the invention. The details of the scale mechanism employed are illustrated in Figure 6, while the control system operated in conjunction therewith and of which control system the scale forms a part is illustrated in Figure 7. In addition, the mechanical arrangement of the weigh station is illustrated in Figures 1 and 2.

In Figure 1 it may be seen that four scales 18—18 are provided at the weigh station, one scale 18 for each of the containers 16. As the containers approach a position overlying the scales 18 they are lowered onto the scales at a controlled rate of descent which minimizes oscillation of the balance-type scale and permits a relatively quick determination of the deficiency of the weight of the container and its contents.

For this purpose, note Figure 2, the carrier bars 58 for each of the containers 16 carries a cam follower roller 82 on the inner end thereof, see also Figure 5. This roller 82 rides on the upper cam surface 83 of an annular ring cam 84 fixed to the drum base 32 by such convenient means as screws or the like 85—85. As the conveyor ring 34 is rotated the cam follower rollers 82 roll on the upper surface 83 of the cam ring 84 and hold the containers 16 with the bottoms thereof above the level of the scale platforms 86 on the scales 18 until the containers 16 near a position overlying the scale platforms 86. Then, the rollers begin to ride down the descent surface 87 in descent-ascent notches 88 in the cam 84. As the rollers 82 ride down the descent surfaces 87, the containers 16 are lowered onto the scale platforms 86 since the slide blocks 59 slide downwardly in the notches 60 and the support and carrying bars 58 move downwardly through apertures 89 and 90 provided therefor in the conveyor ring 34 and the guide plate 61, respectively.

Before the rollers 82 reach the bottom of the descent-ascent notches in the cam ring 84, however, the containers 16 engage the scale platforms 86 and further descent of the roller 82 and the carrying arms 58 merely frees each of the carrier arms 58 from the container 16 which it carries. A little further descent of the roller 82 completely frees the cams from the carrier arms whereby the scale platform 86 carries the entire weight of the container 16 and its contents.

Since the cam 16 and its contents must be accurately weighed at the weigh station, each of the containers is provided with an inclined recess 91 in the bottom thereof and each of the scale platforms 86 is provided with an inclined dome 92 thereon whereby the container is positively and accurately centered on the scale platform 86.

At this point the conveyor is stopped for weighing of the containers and their contents and for actuation of the control system of Figure 7. After completion of the weighing the conveyor ring is again moved one-sixth of a revolution to the adjust weight station or station 3 and the roller cam followers 82 ride up the ascent face 93 of the notches 88 to lift the containers up from the scale platforms 86 to continue in their regular course.

While the scales 18 which stand on the platform 18a at the weigh station might be any desired weight-sensing devices, for purposes of accuracy balance-type scales have been employed here to facilitate the generation of control signals for operating the control system of Figure 7. In Figure 6 it may be seen that the platform 86 of the scale 18 is carried on one end of a balance arm 94 which is substantially centrally pivoted at 95. In the region of the other end thereof the balance arm 94 carries counterweights 96 which are precise weights to counterbalance a container and its contents having a proper weight for eventual dispensing to a cartridge or shell casing 22. At the end of the balance arm 94 carrying the counterweights 96, the balance arm is connected to a small delay-dashpot 97 to reduce any tendencies of oscillation for the balance arm and to bring the balance arm to a stable position quite quickly.

Above the counterweights 96 there are mounted on the scale frame 98 the windings of a vairable linear differential transformer indicated generally at 99. The core 100 of this transformer is movable and is fixed to the balance arm 94, and in this embodiment extends above and coaxially with the counterweights 96.

Essentially, the variable linear differential transformer 99 is a three winding transformer having a primary winding and two oppositely wound secondary windings. Since the core of the transformer is movable, the output potential of each of the secondary windings is dependent upon the position of the core with respect thereto. By moving the core in one direction, the winding towards which it will move will have an increased output potential, while the other winding will have a decreased output potential. Since the windings are opposed, movement of the core will also affect the output phase relation of the two windings.

This type of variable linear differential transformer permits the generation of a control signal having a phase and amplitude which indicates the variation of the weight of the container and its contents from the desired weight therefor and the direction of that variation; that is, it may indicate whether the weight is above or below the desired weight. In the system of the instant invention, the weight of the containers and the contents thereof will usually be below the desired weight since all material standing above the top of the container will have been wiped away by the wiper blades 80 at station 1. This is done for the express purpose of maintaining the weight of the containers and their contents slightly below the desired weight so that additional weight may be added to bring the containers up to the desired rate rather than to attempt to remove powder pellets therefrom to bring the weight down to the desired weight.

Referring now to Figure 7 wherein the transformer 99 with its movable core 100 may be found at the upper left-hand corner of the figure, the control system for the weigh station and adjust weight station may be viewed. There is such a control system as that of Figure 7 for each scale or each container so that while it is understood that there are four such control systems as that illustrated in Figure 7, only one has been shown since the four thereof are identical and will operate in the same manner.

The control system is put into operation when a container 16 is lowered onto the platform of scale 18 thereby causing a reluctance-sensor 101, which senses the presence of the container 16, to close the energization circuit for a relay 102 connected through the reluctance-sensor 101 to a source of electrical energy supplied thereto over leads 103 from source leads 104. Such energization of the relay 102 closes its normally open contacts 105 thereby energizing the reference winding of a two-phase motor 106 from a source of stable alternating current power fed thereto over leads 107 which are connected to the motor 106 through leads 108, the contacts 105 of relay 102 and the normally closed contacts 109 of a relay 110 inserted in the circuit for purposes hereinafter described and which may be simply identified here as a motor position-locking relay.

The second phase of the two-phase motor 106 is energized through leads 111 connecting the same across the secondary windings 112 and 113 of transformer 99 which secondaries are connected in series-opposing relation. The transformer itself is energized by connecting the primary winding 114 thereof through leads 115 to the power source leads 108 connected to the power supply leads 107.

The output of transformer 99, supplied over leads 111, is in addition to being connected to the control phase of the two-phase motor 106, also connected in series opposition with the output of a second variable linear differential transformer 116 by being connected in series with the output leads 117 thereof to a null amplifier 118. The output leads 117 of the second transformer 116 are connected across the secondary windings 119 and 120 which are connected in series opposition in the same manner that the secondaries 112 and 113 of the transformer 99 are connected in series opposition. The primary winding 121 of the second transformer 116 is connected through an adjusting or calibrating or compensating potentiometer or rheostat 122 and through leads 123 to the power supply leads 108 that are connected to the stable alternating current source leads 107.

Since the potential outputs of the two transformers 99 and 116 are connected in series opposition to the null amplifier 118, the null amplifier is arranged to have an output supplied therefrom over leads 124 to the relay 110 when the potentials and the leads 111 and 117 are equal in amplitude and opposite in phase. With this arrangement, the normally closed contacts 109 of the relay 110 are opened when a null condition exists at the input to the amplifier 118. Opening of the normally closed contacts 109 will deenergize the reference supply windings in the first phase of the motor 109 thereby stopping any rotation of the motor 106 and having the effect of locking the rotor of the motor in position.

The rotor of the motor 106 is mechanically coupled as indicated by broken lines 125 and 126 to the movable core 127 in the transformer 116 and to the rotary switch blade 128 in an additional weight selector switch 129, respectively. As pointed out in conjunction with the description of the scale itself, the movable core 100 in the transformer 99 is connected to the balance arm 94 of the scale 18. Thus, movement of the balance arm 94 in the scale 18 will cause movement of the core 100 and thereby vary the potential and phase of the output from the secondaries of the transformer, while movement of the rotor in the motor 106 will cause movement of the core 127 in the second transformer 116 to vary the potential and phase of the output from the secondaries thereof in addition to causing movement of the rotary switch blade 128 in the additional weight selector switch 129.

The addtional weight selector switch 129 has a plurality of annularly arranged fixed contacts, the number of which are selected to cover the entire probable range of additional weight which may be added to the supplementary weight compartments 17 on the containers 16 to bring the weight of material therein up to the accurately measured desired amount to be dispensed, each contact being connected to a control system at the additional weight or adjust weight station, station 3, to cause the addition of successively increased units of weight to the containers. In this embodiment of the invention, the number of contacts has been selected arbitrarily at 24 ranging from zero weight addition to 23 units weight addition and the contacts are identified by the numbers 130 through 153. The contacts 130 through 153 respectively indicate contacts for connection to such control systems in the adjust weight station 3 for the addition of zero units of weight of additional material to 23 units of weight of additional material to be supplied to the containers respectively. Rotation of the rotary contact arm or switch blade arm 28 in the switch 129 effects selective connection with these contacts 130 through 153 and so that there will always be contact with at least one of the contacts, the switch arm 128 is provided with a blade head 154 of a size sufficient to span two contacts and is illustrated as spanning in connection with the 5 unit of weight addition and the 6 unit of weight addition contacts 135 and 136. Through such connection the control system at the adjust weight station will be so controlled that when the container at the weigh station is moved to its proper position at the adjust weight station 5 units of additional weight of material will be added to the container.

In operation, depositing the container 16 with its contents on the balance arm 94 of the scale 18 causes energization of the reference phase of the motor 106 through energization of the relay 102 through the reluctance senser 101, whereby the normally open contacts 105 are closed. The balance arm 94 also moves causing movement of the core 100 in the transformer 99 to a position indicative of the balance or unbalance condition between the container 16 with its material contents and the counterweights 96. If the container 16 and its contents properly balance the counterweights 96 then the transformer 99 will have a null output. Usually, however, the container 16 and its contents will have a weight less than that desired therefor so that the core 100 will be below its center position whereby the output from the secondaries 112 and 113 of the transformer 99 will have a potential in phase indicative of the quantity of the weight deficiency.

This signal will be transmitted over the leads 111 to the control phase of the motor 106 which will then rotate in a direction determined by the phase relation between the input to the control phase and the input to the reference phase thereof. The movement of the rotor in the motor 106 will cause appropriate movement of the core 127 in the transformer 116 until a condition is reached where the output of the leads 117 therefrom is equal in amplitude and opposite phase to the output from the transformer 99. Under such conditions, the input to the null amplifier 118 will be a null whereby the amplifier will operate to cause energization of the relay 110 opening the normally closed contacts 109 thereby deenergizing the reference phase of the motor 106. This deenergization of the reference phase will stop the rotor in the motor and be effective to lock the rotor in position. During rotation of the rotor of the motor 106, because of its coupling to the rotatable switch blade 128 of the additional weight-selector switch 129, the switch blade 128 was also rotated to a position where it contacted the proper fixed contact for addition to a specific number of units of weight of material to the container 16 to bring the weight thereof up to the accurately measured desired amount. When the rotor of the motor 106 is locked then the switch blade 128 is also locked in position so that as the containers 16 are moved from the scales 18 to their proper positions at adjust weight station, station 3, the adjust weight control system will be actuated for the addition of that proper amount of additional material thereto.

After the containers 16 on the scales 18 have been properly weighed they are lifted therefrom as described above and moved on by a one-sixth revolution of the conveyor ring to underlie the adjust weight mechanisms at station 3. Upon lifting the containers 16 from the scales 18, the reluctance sensors deenergize the relay 102 thereby reopening the relay contacts 105. At the same time, the null condition of the input to the amplifier 118 is broken so that the contacts 109 reclose, but since the contacts 105 are now opened the motor 106 remains locked with its reference phase deenergized.

*The adjust weight station—Station 3*

Figure 8:
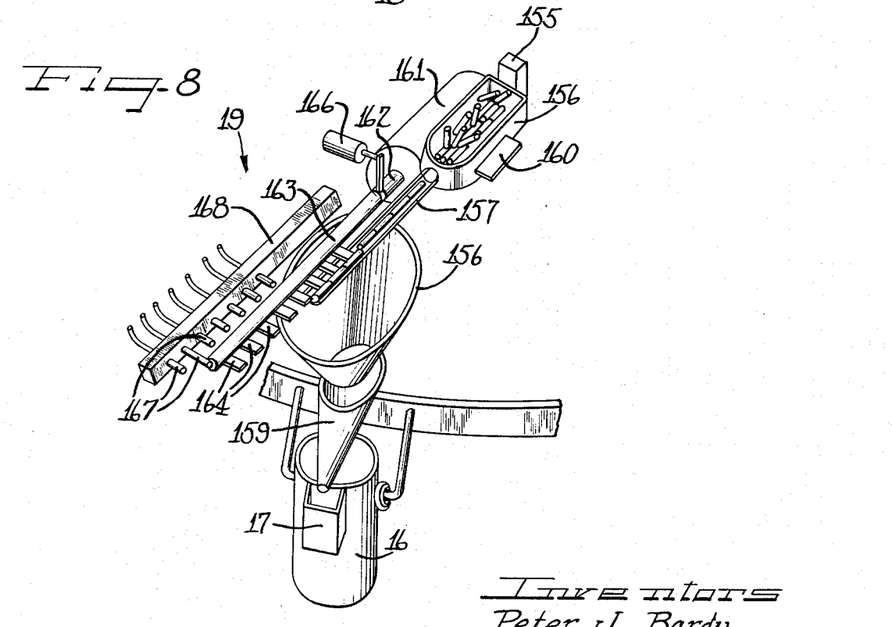
Figure 8 is a fragmental illustration of one of the weight-adjusting mechanisms at the weight adjusting station.

The arrangement, mechanism and control system of the adjust weight station, station 3, are illustrated in Figures 1, 8 and 7, respectively. Figure 8 illustrates one of the adjust weight mechanisms 19 and Figure 7 illustrates one of the adjust weight control systems even though it is clearly understood that there are four such adjust weight mechanisms and systems at the adjust weight station, only one thereof being illustrated since all are identical in construction and similar in opeartion. The adjust weight station has four spaced adjust weight mechanisms 19 which are supported on the drum housing 15 by such convenient means as securing brackets 155 which secure the same in appropriately spaced positions so as to overlie the containers 16 when the conveyor ring moves the containers 16 from the weigh station to the adjust weight station. The adjust weight mechanisms, one of which is illustrated in Figure 8, have a relatively small hopper 156 of material, which in this case is pellets of explosive powder, from which there extends a more or less semicylindrical feed trough 157 under which a funnel 158 is positioned to receive pellets from the feed trough and direct the same through the spout 159 of the funnel into the side compartment 17 of the container 16. A vibrator 160 on the hopper 156 causes the pellets to flow or move into the feed trough 157 in such a manner that the pellets are aligned therein as illustrated.

A pneumatic cylinder 161 is mounted on the drum housing 15 next to each hopper 156 and arranged so that the piston 162 thereof extends parallel to the trough 157. This piston 162 of the cylinder 161 is connected to an additional weight or pellet deflector shaft 163 having a plurality of vanes 164 secured thereto and extending radially therefrom and aligned thereon. This shaft 163 is thus movable axially by movement of the piston 162 and is rotatable by carrying a lever 165 engageable by the piston of a tilt cylinder 166 mounted in such position that energization thereof by pneumatic means will deflect the lever 165 to rotate the arm or shaft 163 and thereby move the vanes 164 in a manner to deflect additional pellets from the trough 157 into the funnel 156 and through the spout 159 thereof into the side compartment 17 of the container 16.

The axial movement of the shaft 163 determines the number of additional pellets to be swept from the trough by the vanes so that controlling the axial movement of the shaft 163 will effect controlled addition of weight to the container 16. This desired control on the axial movement of the shaft 163 is effected by controlled movement of selector stops 167 on a quantity selector stop bar 168 which stops may be moved into the path of movement of the selector shaft 163 and thereby limit the movement thereof. The manner of controlling the stops on the selector stop bar and the control system is illustrated in Figure 7.

In Figure 7 it will be seen that the stops 167 are movable axially thereof and transverse to the axis of the selector shaft 163 by pneumatic cylinder and piston mechanisms 169 actuatable by pneumatic energy supplied thereto through feed lines 170 connected to a source line of pressurized air 171 through solenoid actuated valves 172. The solenoids 173 for these valves are connectible to a source of electrical energy supplied over the electric supply lines 104 through leads 174 and through the normally open contacts 175 of selector control relays 176. The selector control relays 176 each have one side thereof connected to one of the lines 104 while the other side of each thereof is connected to one of the contacts 130 through 153 on the additional pellet selector switch 129 through which they may be connected to the rotatable switch blade 128, a lead 177 through another switch 178 to the other of the power leads 104. In Figure 7 only two solenoid-actuated valves 172 with their solenoids 173 and selector solenoids 176 are illustrated since the operation of all of the valves and solenoids is the same even though there may be 24 thereof for each of the four control systems.

The switch 178 is closable by the cam 51 on the conveyor ring 34 as the container 16 approaches the adjust weight station whereupon the appropriate one or two of the solenoids 176 which are connected to contacts in closed circuit relation with the rotary switch blade 128 are energized to close the contacts 175 and thereby energize the appropriate one or two of the valve solenoids 173 to open the associated valves 172 to permit the appropriate cylinders 169 to be actuated from the air supply lines 171 to move the selected stops 167. This sets the stop for the shaft 163.

As the conveyor ring 34 advances, the cam 51 sequentially next closes a switch 179 connected between a valve solenoid 180 and the electric supply line 104. Energization of the solenoid 180 opens valve 181 to thereby permit pressurized air to flow through line 182 from the air supply main line 171 to cylinder 161 to move the shaft 163 axially thereof until it engages the stop 167 which was moved by the selected cylinder 169 controlled from the selector switch 129 that had been set in position when the container 16 to have its weight adjusted at the adjust weight station had been on the scale 18 at the weigh station.

At about this time the container 16 so underlies the adjust weight mechanism 19 at the adjust weight station that the auxiliary compartment 17 underlies the nozzle 159 of the funnel. Then the cam 51 engages a further switch 183 which closes the circuit for energizing a valve solenoid 184 from the supply lines 104. Energization of the valve solenoid 184 opens the valve 185 whereupon the tilt cylinder 166 may reecive pressurized air from the main supply line 171 and through a feed line 186. This then tilts or rotates the shaft 163 so that the vanes 164 deflect a number of pellets from the trough into the funnel and therethrough into the auxiliary compartment 17.

Thus, when the container 16, under discussion here, was at the weigh station, the motor 106 was rotated until it reached an angular position indicative of the deficiency of the weight of the contents of the container from the desired weight thereof whereupon the motor was deenergized and the rotor was locked in position. At the same time, the rotary switch blade 128 on the additional weight selector switch 129 was locked in position since it is directly mechanically connected to the rotor of the motor 106. In the example illustrated in the control system of Figure 7, the container 16 was five units underweight so that the contact 135 was engaged by the head 154 of the switch blade 128. It also happened that the contact 136 was engaged by the head 154 of the switch blade 128 since the head is of a size sufficient to contact two contacts so that it will always be in engagement with at least one of the contacts. Thereupon, movement of the container towards the adjust weight station resulted in sequential closing of the switches 178, 179 and 183 which resulted in sequential actuation of the appropriate cylinder 169 to cause the five unit additional weight stop 167 to be advanced, cause the shaft 163 to be advanced until it engaged the five units of additional weight stop, and then cause the shaft 163 to be rotated to deflect five pellets or five units of weight into the auxiliary compartment 17 of the container 16 to bring the weight up to the accurately desired weight.

The cylinders are of the self-exhausting type so that when the container is moved away from the station they will be retracted to rerotate the shaft 163 back to its original position angularly, retract the shaft back to its axial starting point and retract the appropriate stops. In the meantime, a new container 16 at the weigh station has caused the motor 106 and the switch 129 to be rotated to a new adjust weight control position therefor in accordance with the deficiency of the weight in the new container. The container 16 which has had its weight adjusted is now moved to the check weigh station, station No. 4.

*Check weigh station—Station No. 4*

Mechanically, the check weigh station is substantially identical to the weigh station in that four scales 20 which are substantially identical to the four scales 18 rest on a stand 20a and are disposed with equal spacing from each other to underlie the four containers 16 which had their weights adjusted at the adjust weight station, station No. 3. At the check weigh station, the containers 16 are lowered onto the platforms of the four scales to determine whether or not the weight of the containers and the contents thereof is the desired weight or differs therefrom by being overweight or underweight. The scales 20 are substantially identical to the scales 18 at weigh station, station No. 2, and therefore are balanced scales which are accurate instruments.

The mechanism of the check weigh station is so similar to that of the weigh station that Figure 2 and the above discussion of the weigh station readily indicate the mechanism by which the containers are lowered onto the platforms of the scales 20, are centered on the platforms, are weighed, and are lifted off the platforms. That is, the cam ring 84 which had descent and ascent notches 88 therein at station No. 2, has similar descent and ascent notches therein at this check weigh station, station No. 4, whereby the rollers 82 on the container support arms 88 will roll into the descent and ascent grooves to lower the containers onto the platforms of the scales 20, and the platforms and scales have raised portions to center the containers 16 thereon and fit into the depressions 91 in the bottom of the containers.

The control signals from the check weigh scales 20, however, are operative to control the pour station, station No. 5, rather than an adjust weight station, and are appropriate signals to indicate whether the contents of the container is accurate at the desired amount or is overweight or is underweight so that the container may be poured if its weight is correct and restrain from pouring if the weight of the contents thereof is incorrect.

In Figure 7 one of the check weigh scales 20 and the associated control system therewith is illustrated schematically in the upper central portion of the figure. There it may be seen that the scale 20 is, like the scale 18, a balance scale having a balance arm 187 pivoted and balanced at 188 and arranged so that the container 16 will rest on the platform at one end thereof, while counterweights 189 counterbalance the container and platform and are at the other end of the arm 188. Also at the end of the balance beam or arm 187 where the counterweights 189 are disposed, the movable core 190 of a third variable linear differential transformer 191 is attached to the balance beam or arm 187 for movement therewith. The transformer 191 is energized by having its primary winding 192 connected through an adjusting rheostat or potentiometer 193 to the stable alternating current source lines 107. The secondary windings 194 and 195 of the transformer 191 are connected so that the output therefrom feeds into an amplifier 196 which in turn has its output feeding into a phase detector 197 which also has an input from the stable alternating current supply lines 107. The output of the phase detector 197 feeds into a relay control 198, outlined by a broken dashed line. Within the relay control unit 198 there may be balanced opposition relays 199 and 200 which may be selectively or simultaneously energized depending upon the three possible conditions of too much weight in the container 16, too little weight in the container 16, and the proper amount of weight in the container 16 for controlling the pouring or restraining from pouring control mechanism at the pour station, station No. 5.

Energization of the relays 199 and 200 is further controlled by a relay 201 controlling normally open contacts 202 and 203 in the circuits between each of the relays 199 and 200 and the phase detector 197. The relay 201 is energized to close the circuit contacts 202 and 203 when a container 16 is placed on the scale 20 since the relay 201 is connected to a source of electrical energy on the lines 104 through leads 204 connected to a reluctance sensor 205 at the scale 20 which permits energization of the relay 201 only when a container 16 is on the scale platform.

Figures 9, 10:
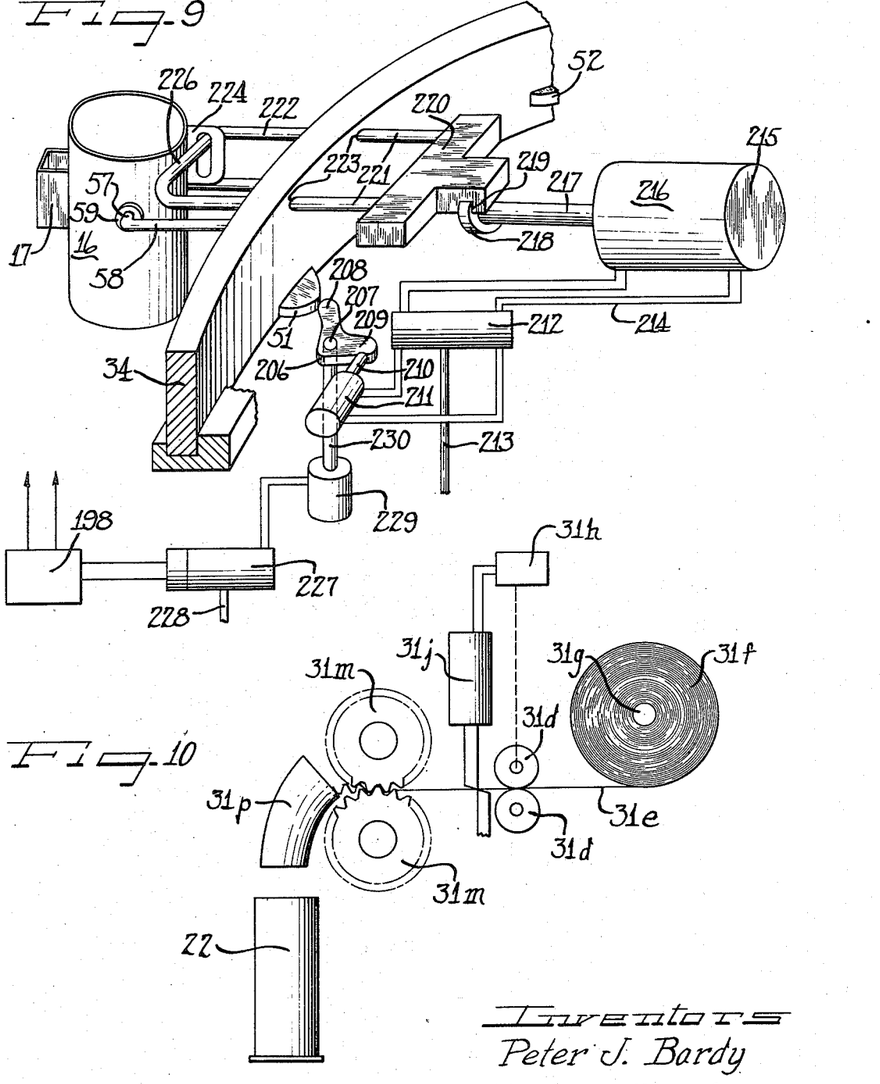
Figure 9 is a partially schematic illustration of the control system at the pouring station.
Figure 10 is an elevational view of the foil charging station viewed as taken substantially along the line X—X.

Thus, when a container is placed upon the platform of the scale 20, the balance arm or beam 187 should balance. If it does not, then the movable core 190 of the transformer 191 will be displaced from a center position so that there will be an output other than a null output from the secondaries 194 and 195 leading to the amplifier 196. The amplifier will amplify the signal and feed it to the phase detector 197 which will compare the phase of the signal to the phase of the stable alternating current supply and the lines 107 and transmit an appropriate signal to the relay control unit 198. The relay windings 199 and 200 of the relay control unit will have been placed in closed circuit relation with the phase detector 197 by closing of the contacts 202 and 203 on the relay 201 which is energized through the reluctance sensor 205 sensing the presence of the container 16 on the scale. In the instant embodiment of the invention there is concern only over two of the three possible conditions; two of the conditions being grouped together as a single condition. That is, the instant embodiment of the invention is concerned with only whether or not the weight of the material in the container 16 is correct. If that weight is correct, then the relay control unit 198 will be so energized and so control the pour station, station 5, as illustrated in Figures 1 and 9, that the container 16 will have the contents poured therefrom into a shell casing when the container reaches the pour station. On the other hand, if the weight of the contents in the container 16 is not correct, whether it be overweight or underweight, then the energization of the relays 199 and 200 will be effective to control the pour station in a manner to restrain pouring of the container.

*The pour station—Station No. 5*

After checking the weight in each of the four containers at station No. 4, the ring conveyor moves the four containers to the pour station for pouring the contents in the containers holding a correct and accurately determined weight of material into cartridge casings or shell casings at the pour station, station No. 5, which is illustrated in Figures 1 and 9. Figure 9, it will be observed, illustrates only one of the four pouring control mechanisms and systems. It will be recognized, however, that there are four such pouring control systems in this embodiment of the invention, one for each of the four containers at the pour station.

At the pour station, when the containers 16 are respectively over the pouring funnels 21 under which the cartridge or shell casings 22 stand to be filled, the pouring mechanism is actuated to invert the containers 16 and their supplementary or auxiliary chambers 17 to pour the contents thereof through the funnels respectively into the cartridge or shell casings. As the conveyor ring moves the containers 16 into their positions, the cam 51 for the first container 16, as shown in Figure 9, engages a cam latch 206 and rotates the same slightly about its pivot support 207. The cam latch 206 is more or less configurated as an L-shaped lever pivoted at the junctions of the legs 208 and 209, and it is the leg 208 which is engaged by the trip cam 51. Rotation of the cam latch 206 causes the arm 209 thereof to press against the piston 210 of a pilot air valve 211 which is in control of pneumatic connection with the pilot-operated valve 212. This actuation of the piston 210 of the pilot valve 211 permits pressurized air flow from the air supply line 213 through the air valve and through the pilot valve and through air line 214 to the head end 215 of a main cylinder 216. This actuates the piston 217. The piston rod 217 in turn carries a catch wheel 218 which is engaged in a slot 219 in a block 220 to which the arms 221 of a pouring link 222 are secured. From Figures 2 and 9 it may be observed that the pouring links 222 are slidable through appropriate apertures 223 in the conveyor ring 34, while a connecting ear or bracket 224 on the radial inner side of the container 16 has a slot 225 therein through which the bight portion 226 of the bracket 222 passes so that movement of the piston rod 217 when the catch wheel 218 is in the slot 219 of the block 220 will cause the bracket 222 to move in a manner to tilt the container 16 actually tipping the same over to pour the contents thereof into the associated funnel 21 at the pour station. The arms 221 of the bracket 222 are sufficiently spaced from each other so that the bottom of the container 16 may move between the arms when the container is inverted for dispensing.

The cylinder 216, like substantially all of the air cylinders utilized in this embodiment of the invention, is a self-retracting cylinder which will retract its piston after an appropriate delay facilitating proper operation of the system. Upon retraction of the piston 217, the latch wheel 218 will withdraw the block 220 and the bracket 222, thereby setting the container 16 back into an upright position. The catch wheel 218 is caught in the slot 219 when the conveyor ring moves the container 16 and its associated parts into position at the pouring station, the spacing and alignment of the parts being appropriate for this purpose.

Return of the piston 217 and thereby return of the container to its normal position is also facilitated by the initiation of movement of the containers from the pour station to the discard pour station, station No. 6, since the trip cam 51 will then release the lever 206 thereby releasing the piston 210 of the pilot valve 211 which controls the air valve 212. It will be noted, however, that the operation of the air valve, the pilot valve and the air cylinder is such that upon initiation of pouring, the entire pouring operation will be completed so that the cylinder 16 will be fully actuated and thereafter the piston 217 will be retracted. This type of operation is incorporated herein since it may happen that one of the other containers 16, which is at the check weigh station, may have an inappropriate weight or an improper weight of material therein which will set the pouring mechanism of Figure 9 to restrain that next container from being poured.

The restrain from pouring operation of the system of Figure 9 is such that when an improper weight of container and its contents appears at the check weigh station on one of the scales 20, the relay controller 198 will be so actuated and energized as to control a solenoid air valve 227 at the pouring mechanism. The air valve 227 which is energized only when an improper weight of container and contents appears at the check weigh station controls pressurized air flow from a source line 228 to a pneumatic cylinder 229, the piston rod 230 of which is the member upon which the lever or cam latch 206 is pivotally secured.

This arrangement is such that when a container 16 is on one of the scales 20 and holds an incorrect weight of material to be dispensed, the relay control 198 will actuate the solenoid valve 227 to in turn actuate the pneumatic cylinder 229 to move the piston rod 230 and thereby withdraw the cam latch or lever 206 from the path of movement of the trip cam 51 so that when the container 16 arrives at the pour station, the cam latch 206 will not be moved by the trip cam 51 and therefore will not actuate the pilot valve 211. This failure to actuate the pilot valve 211 will restrain the air cylinder 216 from being actuated so that it will hold the container 16 from being inverted and the contents thereof from being poured. It will actually positively hold the container 16 through the linkage including the piston rod 217, the catch wheel 218 in the slot 219 of the block 220 coupled to the container 16 through the bracket 222.

It is, of course, understood that there are four such pouring and four such restrain from pouring control mechanisms at the pour station and that the four relay control units 198 are respectively connected to the four pouring restraint control valves 227.

After completion of the operations at the pour station, the ring conveyor 34 is again rotated one-sixth of a revolution so that the containers are moved from the pour station to the discard pour station, station No. 6.

The discard pour station—Station No. 6

At the discard pour station all of the containers are again inverted so that containers holding an incorrect weight of material which were restrained from pouring at the pour station, are emptied into a material return or salvage chute 79a (note Figure 1). This chute will also feed into the same recovery mechanism as the recovery mechanism into which the chute 79 at the original fill station feeds. At the discard pour station, station No. 6, all of the containers are inverted for pouring whether or not they were emptied by pouring at the pour station, station No. 5, and whether or not they were restrained from pouring at station No. 5 by virtue of having an incorrect weight of material therein, since it is an unnecessary and more or less wasted expense to restrain any of the containers from being inverted at the discard pour station, station No. 6, even though they may have been emptied at station No. 5 by having had a correct weight of material therein, as determined at the check weigh station, station No. 4.

The mechanism for inverting the containers 16 at the discard pour station, station No. 6, is substantially identical to the pouring mechanism at station 5, one of which mechanisms is illustrated in Figure 9, except that at the discard pour station, the pouring restraint controls, including the valve 227 and the cylinder 229 and the connections to the relay control 198 are omitted. Thus, at the pour station the cam latch or lever which is equivalent to the cam latch or lever 206 is pivoted on a fixed member and engaged by the appropriate trip cam for actuating the pilot valves and air cylinders equivalent to the units 211, 212 and 216 for inverting the cams through the linkages described hereinabove in conjunction with the pour station mechanism illustrated in Figure 9.

After completion of the discard pour operation, the containers which are now empty are moved to the first station or volume fill station by virtue of rotation of the ring conveyor one-sixth of a revolution. The containers are then ready to begin the entire cycle of operations over again.

The casing conveyor mechanism

In the discussion of the general arrangement of the mechanism and system of this invention, above, it was disclosed that the invention included a conveyor arrangement whereby the cartridge or shell casings 22 are fed to positions under the four hoppers 21 and are then conveyed further to a reject station for the empty casings not filled at the pour station and to a foil-charging station where metal foil is added to the explosive powder pellets in the filled shell casings. It was also described that a belt-type conveyor or other equivalent type of conveyor 23 carry the empty shell or cartridge casings 22 to be filled forwardly to a transverse running belt or equivalent-type conveyor 26 and to a lug-type conveyor 25. In Figure 1 these conveyors are illustrated in detail showing that as the first belt conveyor 23 approaches the transverse conveyor 26, individual fingers 25a on the lug conveyor belt 25b interdigitate with the shell casings 22. The lug or finger belt 25b is supported on a pair of horizontal drive rollers or pulleys 25c at least one of which is driven whereby the belt is driven to move the casings 22 across the transverse conveyor belt 26. The drive mechanisms for the conveyors 23, 25 and 26 are preferably intermittent in operation so that the conveyors will operate to position the cartridge casings or shell casings 22 in groups of four on the conveyor belt 26 with each of the casings 22 in each group of four being so spaced as to properly underlie the nozzle or discharge ends of the funnels 21 into which the powder or pellet containers 16 are poured. That is, four shell casings 22 are transported by the lug conveyor 25 onto the conveyor 26 whereupon the conveyor 26 is moved to transport the shell casings radially inwardly of the drum housing 15 whereupon the belt conveyor is again stopped and the lug belt conveyor and the feed conveyor 25 and 23, respectively, are again actuated to move four more casings onto the transverse belt 26 which is then again moved to feed four aligned shell casings into a position underlying the funnels 21 at the pour station. This intermittent driving of the conveyors is timed and controlled together with the drive for the ring conveyor 34 to properly coordinate the positioning of empty shell casings under the funnels 21 and the positioning of a group of containers 16 above the funnels to have the powder poured therefrom through the funnels into the shell casings.

After a row of casings 22 are filled at their positions underlying the funnels 21, they are moved again by movement of the conveyor 26 and interdigitated with the lugs 27a on a lug belt 27b on a second lug-type conveyor 27. This second lug belt 27 may be continuous in operation or intermittent in operation as desired and moves the filled cartridge casings or shell casings onto another longitudinally running belt or chain or the like type conveyor 28 which then carries the shells to a station 29 for rejecting the empty shell casings from the production line of the conveyor 28, which empty cartridge casings have occurred in the line due to improper weights of material in the containers 16.

The empty shell reject station—Station 29

At the empty casing or reject station inserted in the system for rejecting from the conveyor 28 the occasional shell casing which was not filled at the pour station, station 5, a small resiliently supported platform underlies the upper run of the conveyor belt 28. The springs actually supporting the platform are of a strength determined and selected by the weight of the shell casings and the contents thereof so that a full shell casing sitting on the belt as it runs over the platform will cause at least a slight depressed movement of the platform. The platform is shown in a broken dashed outline in Figure 1 underlying the upper run of the conveyor 28 and identified at 29a. The springs are also selected to be of such strength and resiliency that the passage of an empty shell casing on the conveyor over the platform 29a will cause very little if any depressed movement of the platform 29a.

Thus, when a full casing overlies the platform, the platform will be depressed and will actuate and open a normally closed microswitch 29b which is in series interconnection with a normally open feeler microswitch 29c. The feeler microswitch 29c is closed as the cartridge casing 22 passes it and engages the switch feeler arm 29d. These switches 29b and 29c control the energization of the solenoid-operated pneumatic cylinder 29e having a piston rod 29f operable upon actuation of the air cylinder and solenoid valve 29e to push an empty cartridge casing 22 laterally off of the conveyor belt 28 and onto a conveyor 30 which may direct the empty shells back into the supply source therefor.

As stated immediately above, a full cartridge casing 22 overlying the platform 29a will depress the platform to open the normally closed microswitch 29b. Since the switch 29b and the switch 29c are in series in control of the solenoid-actuated valve and pneumatic cylinder 29e, the valve and pneumatic cylinder 29e will not be energized to move the piston 29f and thereby will not move the full cartridge casing 22 off of the conveyor 28 onto the conveyor 30. On the other hand, when an empty cartridge casing 22 rides over the platform 29a, the switch 29b will not be closed and the feeler arm 29d engaging the casing 22 will close the switch 29c whereby a cycle will be completed for actuating the solenoid valve and pneumatic cylinder 29e so that the piston and rod 29f will push the empty cartridge casing 22 off of the conveyor 28 onto the conveyor 30.

When the full shell casings pass the reject station 29 they are then fed by the conveyor to a foil addition station 31 utilized for adding metal foil to cartridge casings of the 75 mm. size and larger.

*The foil addition station*

The foil addition station, indicated generally at 31, is illustrated in schematic detail in both Figures 1 and 10 wherein it is illustrated that a roll of the particular metal foil desired to be charged into the filled casings 22 is rotatably supported for having the foil pulled therefrom by feed rollers, cut off in the desired length by a shear mechanism, corrugated by a gear arrangement and then directed into the cartridfe casing or shell casing over the explosive powder pellets dispensed into the casing. As shown in these figures, a feeler switch 31a is engaged by a cartridge casing 22 approaching the foil addition station on the conveyor 28 to energize a control mechanism 31b to operate a motor 31c in driving connection with one or both of the feed rolls 31d. This driving of the feed rolls 31d pulls the foil strip 31e from a roll 31f which is rotatably supported by a mounting shaft 31g. Feed rolls are also coupled to a control mechanism 31h that controls a cutter or shear mechanism 31j to cut the strip to the length thereof desired to be charged into the cartridge casing 22. As the strip is fed forwardly it is engaged by a pair of driven corrugating gears 31m so that as the strip passes between the interdigitating gears, it is corrugated and fed through a deflector funnel 31t which directs the corrugated foil into the cartridge casing which is now moved into a position under the funnel from the position where it engaged and closed the feeler switch 31a that controls energization of the control unit 31b for the drive motor 31c.

After passing from the foil addition station 31, the cartridge or shell casings are then carried by the conveyor 28 to such further operating stations as may be desired to act upon the same for purposes of adding heads thereto and ramming the powder and the foil, etc.

From the foregoing it will be clearly seen that the present invention is of general utility even though an exemplary embodiment thereof has been illustrated and described here and it will be further observed that numerous variations and modifications may be effected without departing from the true spirit and scope of the novel concepts and principles of this invention. We, therefore, intend to cover all such modifications and variations as fall within the true spirit and scope of the novel concepts and principles of this invention.

We claim as our invention:

1. In a mechanism to dispense material in accurately measured quantities, a support structure, a conveyor relatively movably carried on said support structure, a container carried by said conveyor, means on said support structure to intermittently controllably drive said conveyor to move said conveyor successively to a series of stations along the path of movement of said conveyor; a fill station to fill said container including a hopper, a gate on said hopper, means to open said gate when said container is aligned with said hopper, means actuated by overflow of material from said container to close said gate, and means to wipe across said container to limit the level of material in said container; a weigh station to weigh said container and material therein and determine the deficiency of weight of material below the desired weight therefor including a scale mechanism, a first displacement-sensing differential transformer connected to said scale and having as an output a signal having a phase and amplitude corresponding to the weight error of the material in the container, a two-phase motor having an input connected to the output of said transformer, a reference supply of electrical energy connected to an input of each said first transformer and said motor, a second displacement-sensing transformer having a core connected to an output of said motor to thereby have an output corresponding to angular displacement of said motor, the output of said transformers being connected in series opposition, a null amplifier having an input which is the resultant signal from a series opposition connection of the outputs of said transformers, a relay energized from said null amplifier when the outputs of said transformers are equal and opposite and having normally closed contacts in series with the input to said motor to deenergize said motor when said relay is energized, and a second relay having normally open contacts in series with said normally closed contacts and energized through means on said scale to sense the presence of said container, and a sweep switch mechanism connected to the motor output, said switch having a plurality of relatively fixed contacts and a relatively movable contact whereby movement of said movable contact with said motor connects the same with different ones of said fixed contacts and deenergization of said motor locks said movable contact in its position; a weight-adjusting station to add sufficient material to the container to cause the weight of material therein to be an accurately measured desired amount including a supplemental material hopper, a trough leading from said supplemental hopper, a vibrator on said supplemental hopper to assist the flow of material therefrom into said trough and to orient material in said trough, a shaft slidably and rotatably mounted adjacent and substantially parallel to said trough, a material deflecting vane on said shaft to move a selected quantity of the material from said trough into said container when said shaft is moved axially and rotated, a stop bar, a plurality of selectively operable stop mechanisms on said stop bar connected to and controlled by said sweep switch mechanism; a weight-checking station including a scale, a third differential transformer, an output from said transformer indicative of the weight of the container and contents thereof, and means actuated by the output of the transformer to control a relay network; and a pouring station to pour the material from said container, and means to restrain pouring of the material from the container if the weight thereof is different from the desired weight, and means interconnecting the relay control and the pouring restraining means.

2. In a mechanism to dispense material in accurately measured quantities, a support structure, a conveyor relatively movably carried on said support structure, a plurality of containers carried by said conveyor, means on said support structure to intermittently controllably drive said conveyor to move said containers successively, in groups, to a series of stations along the path of movement of said conveyor; a fill station to fill said containers including a hopper, a gate on said hopper, means to open said gate when said containers are aligned with said hopper, and means to close said gate when said containers are filled; a weigh station to weigh said containers and the material therein and determine any deficiency in weight of material below the desired weight therefor including a scale mechanism, and signal means to provide a signal indicative of the weight error, and a motor having a rotor angularly movable, means interconnecting the signal means and the motor whereby the angular displacement of the rotor and the motor is a function of the weight error; a weight-adjusting station to add sufficient material to the containers to cause the weight of material therein to be the accurately measured desired amount including a supplemental material hopper, selector switch means to control the quantity of additional material to be added to the containers, and means interconnecting the selector switch means and the rotor of said motor to control said selector switch means in accordance with the weight deficiency determined at said weigh station; a weight-checking station to determine the accuracy of the weight of material in the containers and compare the same with the desired weight therefor including a second scale, signal means in said second scale to provide a signal indicative of the weight of the material in the container and indicative of any error between the weight of the material in the container and the desired weight; a pouring station to pour material from the containers into devices to utilize the material and including means to invert the containers to pour the material therefrom, and means responsive to the signal from the signal means in the second scale to restrain the container pouring means when there is an error in the weight of the material in the container; and a discard pour station to empty containers which were not poured at the pour station and including means to invert all of the containers.

3. In a mechanism to dispense material in accurately measured quantities, a support structure, a conveyor relatively movably carried on said support structure, a plurality of containers carried by said conveyor to be moved, in groups, to a plurality of stations about the support structure, and means on the support structure to controllably drive said conveyor operatively to move the containers, in groups, to the successive stations about the support structure, a fill station to fill said containers and including means to automatically actuate the fill station when a group of containers arrive at the fill station to fill the containers and further means automatically actuatable to stop the filling operation at the fill station when the containers are filled, a weigh station to weigh the containers and material therein filled at said fill station to determine the deficiency of weight of material in the container below the desired weight therefor including a scale mechanism and means in said scale mechanism to provide a signal indicative of the deficiency, an adjust weight station to add additional weight of material to said containers and including means responsive to said signal means to control the amount of additional weight to be supplied to the containers and means automatically actuatable at said adjust weight station by arrival of a group of containers thereat to actuate the mechanism to adjust the weight of material in the containers, a check weigh station to determine the accuracy of the weight of the material in the containers including a second scale mechanism and a second signal means to provide a signal indicative of any error in the weight of material in the containers respectively, and a pour station to pour the material from the containers into devices to utilize the material including means responsive to said second signal means to restrain pouring of the containers if the weight of the material therein is incorrect.

4. In a system to dispense material in accurately measured quantities, a container, means to fill said container with material, means to weigh said container, means to add material to the container controlled by the weighing means, means to reweigh the container, means to pour the material from said container including means responsive to said reweighing means to restrain said pouring means from pouring the material from the container when the material therein is of an incorrect weight, means to discard-pour the container when the weight thereof is incorrect, and means to transport said container to each of said means successively.

5. In a system for dispensing material in accurately measured quantities, a plurality of containers, means to fill said containers with material, means to weigh said containers and the material therein, means in said weighing means to provide a signal indicative of the weight of material in the container, means to add material to said containers responsive to said signal means, means to reweigh said containers and the material therein including second signal means providing a signal indicative of the weight of material in the containers, means to pour material from said containers including means responsive to the second signal means to restrain said pouring means from pouring the material when the weight of material therein is incorrect, means to discard-pour material from said containers when the weight of material therein is incorrect, and means to transport said containers to each of said means successively.

6. In a system to dispense material in accurately measured quantities, a series of groups of material containers, means to intermittently transport said groups of containers to a succession of stations, means to fill said containers at a first station, means to weigh said containers at a second station and to produce a control signal, means at a third station to add additional material to the containers controlled by the control signal producing means at the second station, means to reweigh the containers at a fourth station, means to pour the containers at a fifth station, means at said fifth station to restrain the pouring means at the fifth station and responsive to the reweighing means at the fourth station, and means to discard-pour material from the containers.

7. In a system for dispensing material in accurately measured quantities, a first series of portable containers, means to fill the containers with the materials to be dispensed, means to level the material at the top of the containers, means to weigh the containers with the material therein and determine any necessary quantity of material to be added to each of the containers to cause the quantity of material in each of the containers to have a predetermined weight, means responsive to the weighing means to add the said necessary quantity of material to each of the containers, means to reweigh the containers to determine the accuracy of weight of material in each thereof, a second series of containers, means to pour the material from the first containers to the second containers including means responsive to the reweighing means to withhold pouring material from the first containers which hold an incorrect quantity of material, means to discard-pour the material from the first containers from which the material was not poured by the first-mentioned pouring means, and means to transport the first series of containers to each of said means successively, and means to transport the second series of containers past said pouring means.

8. In a system to dispense material in accurately measured quantities, a first series of portable containers, means to fill the containers with material to be dispensed, means to level the material at the top of the containers, means to weigh the containers with the material therein and determine the necessary quantity of material to be added to each container to cause the quantity of material in each of the containers to have a predetermined weight, means responsive to the weighing means to add the necessary quantity of material to each of the containers, means to reweigh the containers to determine the accuracy of weight of material in each of the containers, a second series of containers, means to pour the material from the first containers into the second containers when the first containers have a correct weight of material therein and including means responsive to the reweighing means to withhold pouring material from containers having an incorrect weight of material therein, means to transport the second series of containers to said pouring station and away therefrom, means to reject empty containers of the second series after the containers pass the pouring station, means to further process said second series of containers, and means to transport the first series of containers to each of the means acting thereon.

9. In a system to dispense material in accurately measured quantities, a container, a conveyor to carry said container to a plurality of stations to act thereon, a fill station, said fill station including a hopper of material to be discharged into said containers, a gate on said hopper to open and close the hopper, pneumatic means to operate said gate, means on said conveyor to actuate said pneumatic means, and further means responsive to overflow of material from the container to close said gate.

10. In a system to dispense material in accurately measured quantities, a container having a main compartment and an auxiliary compartment, a conveyor to carry said container to a plurality of stations to act thereon, a fill station to fill the main compartment of said container, said fill station including a hopper of material to be discharged into said main compartment of said container, a gate on said hopper to open and close the hopper, pneumatic means to operate said gate, means on said conveyor to actuate said pneumatic means, further means responsive to overflow of material from the container to close said gate, and means to shield the auxiliary compartment and maintain the same free of material while the main compartment is filled from said hopper.

11. In a system to dispense material in accurately measured quantities, a container, a conveyor to carry said container to a plurality of stations to act thereon, a fill station to fill said containers, said fill station including a hopper of material to be discharged into said containers, a gate on said hopper to open and close the hopper, pneumatic means to operate said gate, means on said conveyor to actuate said pneumatic means, further means responsive to overflow of material from the container to close said gate, means to weigh the container to determine any deficiency of weight therein from the desired weight therefor, means to adjust the weight of material in the container controlled by the weighing means, means to reweigh the container, and means controlled by the reweighing means to pour the container if the weight of material therein is the desired weight.

12. In a system for dispensing material in accurately measured quantities, a container, means to transport the container, means to fill the container, and means to control supplying additional material to the container so that the weight of material in the container will have a predetermined value and including a scale mechanism to sense the weight of the container and the material therein, a variable linear differential transformer in said scale mechanism and arranged therein to have an output with an amplitude and phase indicative of the difference between the weight of said container and the material therein and said predetermined value, a servo motor having one phase thereof connected to the output of said transformer and another phase thereof connected to a stable source of alternating current, a second transformer having a movable core mechanically connected to said motor and having an output of a phase and amplitude indicative of the direction and angular position of a rotor in the said motor, means connecting the outputs of said transformers in series opposition, an amplifier connected to said means whereby the amplifier has an input which is the vectorial difference between the outputs of said transformers, a relay connected to said amplifier and energized therefrom to deenergize said motor when the outputs of said transformers are equal and opposite to thereby lock the motor in its angular position, and an additional weight selector switch and system connected to said motor and set thereby to add a proper additional weight of material to said container to cause the same to have the predetermined weight therefor.

13. In a system for dispensing material in accurately measured quantities, a container, means to transport the container, means to fill the container, and means to control supplying additional material to the container so that the weight of material in the container will have a predetermined value and including a scale mechanism to sense the weight of the container and the material therein, a variable linear differential transformer in said scale mechanism and arranged therein to have an output with an amplitude and phase indicative of the difference between the weight of said container and the material therein and said predetermined value, a servo motor having one phase thereof connected to the output of said transformer and another phase thereof connected to a stable source of alternating current, a second transformer having a movable core mechanically connected to said motor and having an output of a phase and amplitude indicative of the direction and angular position of a rotor in the said motor, means connecting the outputs of said transformers in series opposition, an amplifier connected to said means whereby the amplifier has an input which is the vectorial difference between the outputs of said transformers, a relay connected to said amplifier and energized therefrom to deenergize said motor when the outputs of said transformers are equal and opposite to thereby lock the motor in its angular position, and an additional weight selector switch and system connected to said motor and set thereby to add a proper additional weight of material to said container to cause the same to have the predetermined weight therefor, and means to reweigh the container to check the weight of material and container, and means controlled by the reweighing means to pour the material from the container when the weight of material in the container is the predetermined value therefor.

14. In a system to dispense material in accurately measured quantities, a container, means to fill the container, means to weigh the container and the material therein including signal means to provide a signal indicative of any difference between the weight of the material in the container and the desired weight therefor, an additional weight selector switch positioned in accordance with the signal from said signal means, means to adjust the weight of the container including a plurality of relays connected to contact positions on said selector switch to be selectively energized in accordance with the position of said selector switch as controlled by said signal means, a plurality of electropneumatic devices connected to said relays respectively for selective energization, a stop bar, a plurality of movable stop pins in said stop bar respectively connected to said electropneumatic devices for select movement of said stop pins, a supplementary hopper, a trough on said hopper for material flow from said hopper into said trough, a deflector shaft, electropneumatic means to move said shaft axially thereof to engage the same with a selectively moved stop pin, and further electropneumatic means to rotate said shaft, and means on said shaft to engage material in said trough whereby rotation of said shaft deflects a selected quantity of material from said trough to cause the same to be poured into said container.

15. In a system to dispense material in accurately measured quantities, a container, means to fill the container, means to weigh the container and the material therein including signal means to provide a signal indicative of any difference between the weight of the material in the container and the desired weight therefor, an additional weight selector switch positioned in accordance with the signal from said signal means, means to adjust the weight of the container including a plurality of relays connected to contact positions on said selector switch to be selectively energized in accordance with the position of said selector switch as controlled by said signal means, a plurality of electropneumatic devices connected to said relays respectively for selective energization, a stop bar, a plurality of movable stop pins in said stop bar respectively connected to said electropneumatic devices for select movement of said stop pins, a supplementary hopper, a trough on said hopper for material flow from said hopper into said trough, a deflector shaft, electropneumatic means to move said shaft axially thereof to engage the same with a selectively moved stop pin, and further electropneumatic means to rotate said shaft, means on said shaft to engage material in said trough whereby rotation of said shaft deflects a selected quantity of material from said trough to cause the same to be poured into said container, and means to reweigh the container, and means controlled by the reweighing means to effect further processing of the container and the material therein.

16. In a system to dispense material in accurately measured quantities, a container, means to fill the container, means to weigh the container, means controlled by the weighing means to adjust the weight of the material in the container, and means to reweigh the container and material therein including a balance-type scale, a variable linear differential transformer in the scale, a movable core in the transformer connected to the scale for conjoint movement therewith whereby the transformer will have an output indicative of the direction and amplitude of any error between the weight of the material in the container and the desired weight therefor, and means to pour the material from the container into a second container to utilize the material, said pouring means being controlled by the output of said transformer to refrain from pouring the material from the first container into the second container when the weight of material in the first container is different from the desired weight therefor.

17. In a system for dispensing material in accurately measured quantities, means to fill a container, means to weigh the container with the material therein, means to adjust the weight of material in the container, means to reweigh the material, signal means in the reweighing means to provide a signal indicative of any error between the weight of material in the container and the desired weight therefor, and means to pour the contents of the container into a second container to utilize the material including a bracket connected to the container, support structure carrying the container, means on the support structure to trip a system for moving the bracket to pour the contents of the container therefrom.

18. In a system for dispensing material in accurately measured quantities, means to fill a container, means to weigh the container with the material therein, means to adjust the weight of material in the container, means to reweigh the material, signal means in the reweighing means to provide a signal indicative of any error between the weight of material in the container and the desired weight therefor, and means to pour the contents of the container into a second container to utilize the material including a bracket connected to the container, support structure carrying the container, a pneumatic system including a valve and cylinder and piston assembly to move the bracket and thereby tilt the container to pour the contents therefrom, tripping means on the support structure to actuate the pneumatic system.

19. In a system for dispensing material in accurately measured quantities, means to fill a container, means to weigh the container with the material therein, means to adjust the weight of material in the container, means to reweigh the material, signal means in the reweighing means to provide a signal indicative of any error between the weight of material in the container and the desired weight therefor, and means to pour the contents of the container into a second container to utilize the material including a bracket connected to the container, support structure carrying the container, a pneumatic system including a valve and cylinder and piston assembly to move the bracket and thereby tilt the container to pour the contents therefrom, tripping means on the support structure to actuate the pneumatic system, and electropneumatic means between said tripping means and said pneumatic system to decouple the tripping means and the pneumatic system and controlled by said signal means when the weight of the material in the container is in error.

20. In a system for dispensing and handling material in accurately measured quantities, a container, means to fill the container, means to weigh and adjust the weight of the container and the material therein, means to check the weight of the material in the container, a second container, means to pour the material from the first container into the second container, means to transport the second container past the pouring means for the first container, means to restrain pouring of the first container if the weight of material therein is improper, means to reject the second container from the transporting means if it is not filled at the pouring means including means to sense the presence of the container, means to sense the presence of weight in the container, and means actuated by both of said sensing means to reject the container if it is not filled.

21. In a system for dispensing material in accurately measured quantities, a container, means to transport the container to a plurality of stations having operating mechanism at different stations to act thereon, said mechanism including means to fill the container with material, means to weigh the container and the material therein including a balance-type scale, means on the conveyor to lower the container onto the scale, signal-producing means in the scale responsive to the weight of the container and material and operative to provide a signal indicative of the difference between the weight of the material in the container and a predetermined desired weight therefor, motor means connected to said signal means to have an angular displacement corresponding to the signal from the signal means, selector switch means connected to said motor means to have a selector switch position corresponding to the angular position of said motor means, a plurality of electrical circuits selectively energized in accordance with the position of said selector switch, electrically energized means connected to said circuits to adjust the weight of the material in the container and operative to add a quantity of material to the material in the container according to the circuit energized by said selector switch.

22. In a system for dispensing material in accurately measured quantities, a container, means to transport the container to a plurality of stations to act thereon, including means at one station to fill the container with material, means to weigh the container and the material therein including a balance-type scale, means on the conveyor to lower the container onto the scale, signal-producing means in the scale responsive to the weight of the container and material and operative to provide a signal indicative of the difference between the weight of the material in the container and a predetermined desired weight therefor, motor means connected to said signal means to have an angular displacement corresponding to the signal from the signal means, a multi-position selector switch means connected to said motor means to have a selector switch position corresponding to the angular position of said motor means, a plurality of electrical circuits selectively energized in accordance with the position of said selector switch, electrically energized means connected to said circuits to adjust the weight of the material in the container energized through said selector switch means to add a quantity of material to the material in the container according to the circuit energized by said selector switch, reweighing means to reweigh the container and material therein, and means controlled by the reweighing means to pour material from the container when said container weighs more or less than said predetermined desired weight.

References Cited in the file of this patent

UNITED STATES PATENTS

| | | |
|---|---|---|
| 733,096 | Tyler | July 7, 1903 |
| 767,394 | Doble | Aug. 16, 1904 |
| 1,079,495 | Jeffries et al. | Nov. 25, 1913 |
| 1,300,274 | Jeffries et al. | Apr. 15, 1919 |
| 1,713,575 | Warwick | May 21, 1929 |
| 2,356,266 | Ogilvie et al. | Aug. 22, 1944 |
| 2,403,286 | Johnson | July 2, 1946 |
| 2,521,998 | Rottier | Sept. 12, 1950 |
| 2,581,695 | Olofsson et al. | Jan. 8, 1952 |
| 2,678,185 | Howard | May 11, 1954 |
| 2,807,975 | Bohlman et al. | Oct. 1, 1957 |
| 2,822,718 | Niepmann | Feb. 11, 1958 |

FOREIGN PATENTS

| | | |
|---|---|---|
| 492,634 | Great Britain | Sept. 23, 1938 |